Sept. 29, 1931.  C. E. F. AHLM ET AL  1,824,975
MOTOR VEHICLE MECHANISM
Filed June 12, 1929   3 Sheets-Sheet 1
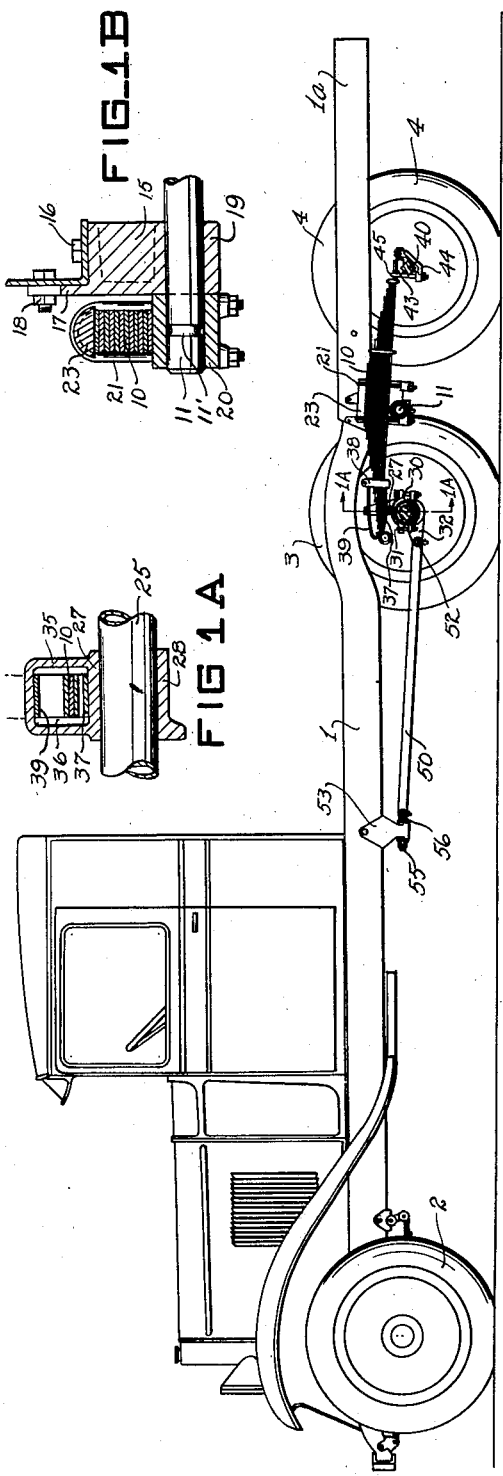
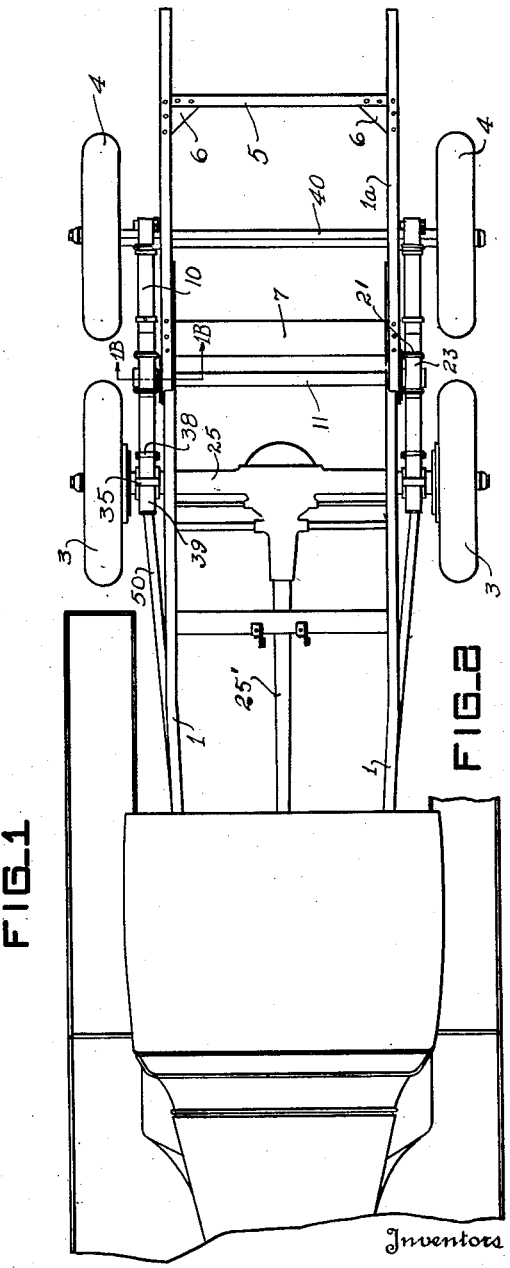

Sept. 29, 1931.  C. E. F. AHLM ET AL  1,824,975
MOTOR VEHICLE MECHANISM
Filed June 12, 1929   3 Sheets-Sheet 2
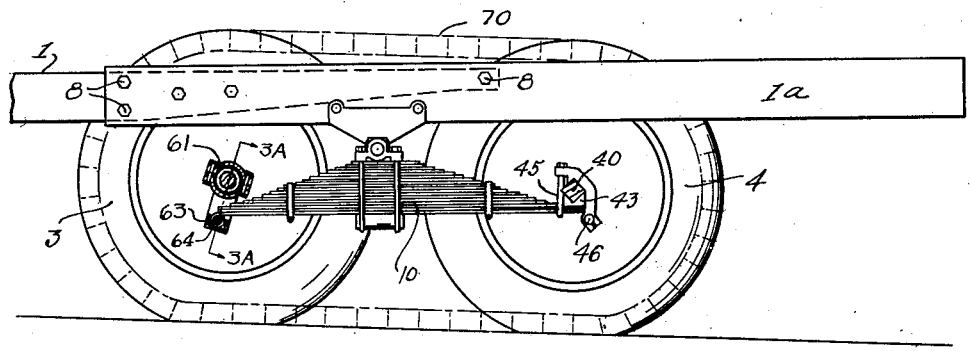
FIG_3
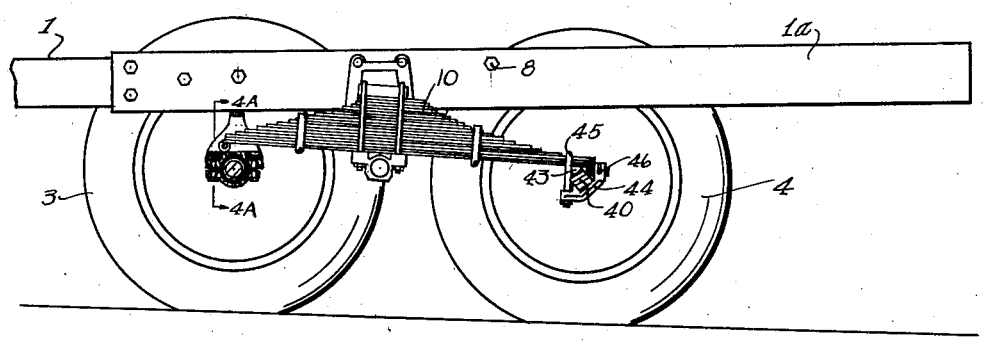
FIG_4
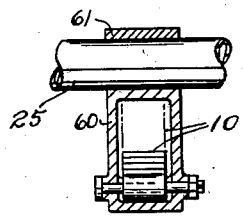
FIG_3A
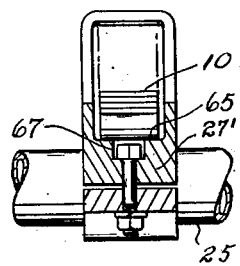
FIG_4A
Inventors
Charles E. F. Ahlm
George L. Elmslie
By Bates, Golrick & Teare
Attorneys Sept. 29, 1931.   C. E. F. AHLM ET AL   1,824,975
MOTOR VEHICLE MECHANISM
Filed June 12, 1929   3 Sheets-Sheet 3
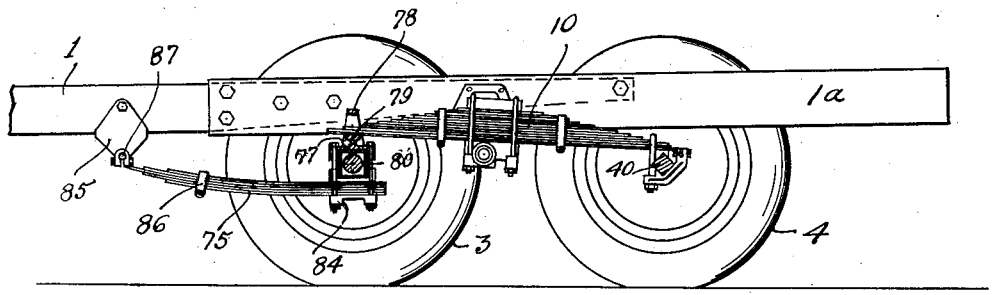
FIG_5
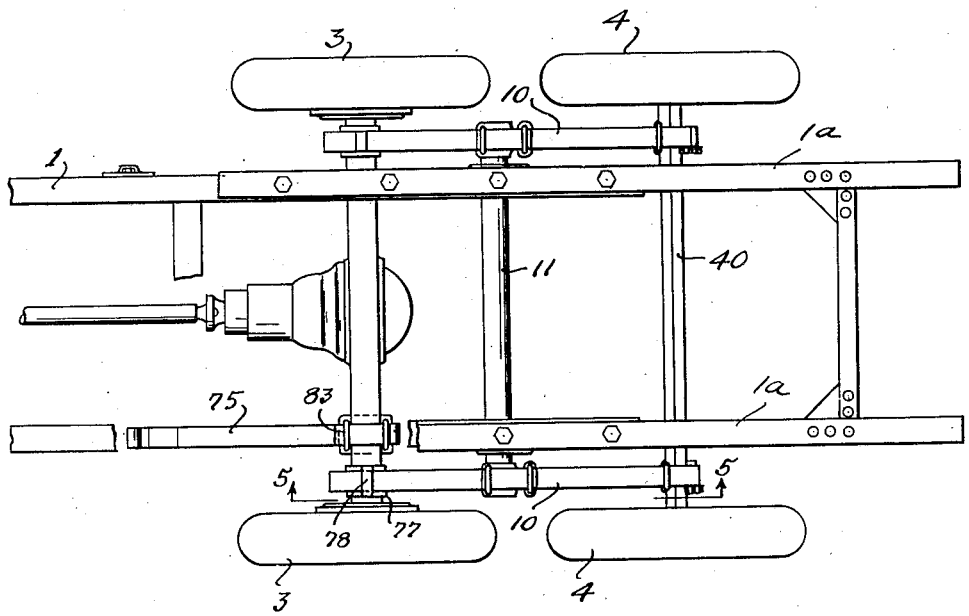
FIG_6

Patented Sept. 29, 1931

1,824,975

UNITED STATES PATENT OFFICE

CHARLES E. F. AHLM, OF CLEVELAND, AND GEORGE L. ELMSLIE, OF EAST CLEVELAND, OHIO, ASSIGNORS TO CONTINUOUS TORQUE TRANSMISSION COMPANY, OF CLEVELAND, OHIO, A CORPORATION OF DELAWARE

MOTOR VEHICLE MECHANISM

Application filed June 12, 1929. Serial No. 370,169.

The object of this invention is to provide an extra load carrying mechanism in connection with a motor driven vehicle, and specifically, to provide a supporting arrangement for a pair of load carrying wheels, in addition to the usual load carrying traction wheels.

The invention is particularly concerned with the provision of additional axle and wheels which shall have a resilient connection with the truck frame, the arrangement being such that it will be simple and easy to construct and apply to the truck frame without material change in the original chassis structure.

A further object is to provide a spring suspension for traction and non-traction wheels, in such arrangement that the traction wheels will, without undue strain, carry the greater part of the load, thereby securing better traction than as though the load were equally divided.

Other objects and features of the invention will become apparent from the following description relating to the accompanying drawings, which show the preferred forms. The essential characteristics are summarized in the claims.

In the drawings, Fig. 1 is a side elevation of one form of our invention; Figs. 1a and 1b are detailed cross sectional views, as indicated by the lines 1a—1a and 1b—1b on Figs. 1 and 2 respectively; Fig. 2 is a fragmentary plan view of the mechanism shown in Fig. 1; Fig. 3 is a fragmentary side elevation of a rear portion of a truck chassis, equipped with a modified four-wheel suspension; Fig. 3a is a detailed cross sectional view, as indicated by the lines 3a—3a on Fig. 3; Fig. 4 is a side elevation similar to Fig. 3, showing still another modification; Fig. 4a is a detailed cross sectional view, as indicated at 4a—4a on Fig. 4; Fig. 5 is a longitudinal sectional side elevation of a modification for use, particularly where the drive to the live axle does not include a torque tube, the section being indicated by the line 5—5 on Fig. 6; and Fig. 6 is a fragmentary plan view of the mechanism shown in Fig. 5, partly broken away to show one of the torque reaction members in plan.

In general, the arrangement comprises a pivotal support on the chassis frame for a pair of multiple leaf springs, the springs supporting the chassis in such manner that all the load is imparted to the wheels through the springs. A non-driven or dead axle is disposed preferably rearwardly from the live or driven axle. One end of each spring has a floating connection with the driving axle, and the other end of each spring has a substantially rigid connection with the non-driven axle. The pivot axis of the springs is disposed materially closer to the vertical plane of the live axle than the corresponding plane of the dead axle, in order to increase the traction of the driven wheels, and for other reasons that will be hereinafter more clearly set forth.

It is to be understood that while we have shown the intermediate axle as driven, the arrangement may be reversed, that is to say, the rearmost axle may be the driven axle, and the intermediate, the non-driven axle. In such case the longer length of spring will be forwardly from the spring pivot center and the shorter length rearwardly of the pivot center.

Referring in detail to the drawings, 1 designates the usual side frame members of the truck chassis, there being two of these, one for each side of the truck. These frame members, as illustrated, are channels. The usual dirigible wheels are indicated at 2, the driven or traction wheels at 3, and the additional load supporting wheels at 4. A suitable platform or truck body (not shown) may be carried on the frame, or an extension thereof, designated 1a.

The frame extension may comprise a pair of structural channels having the usual web and flanges, and these extension channels may be strengthened and tied by cross braces, one of which is shown at 5 provided with gusset plates at 6, and another of which comprises a cross plate 7 near the forward end of the extension. This too may be suitably strengthened by flanges, if desired. The extension is simply bolted, for example as shown in Fig. 3 at 8, to the telescoped rear ends of the chassis frame members 1, shown in broken lines.

The spring suspension includes a pair of leaf springs, one at each side. These are designated 10 in all figures, and may comprise laminated leaves of the usual type, the leaves being preferably of decreasing length toward the top, as shown. The pivotal connection between the springs and chassis frame or frame extension includes a comparatively heavy cross bar 11, the ends of the bar lying entirely beneath the respective springs as shown in Fig. 1, 4 and 5, or above, as shown in Fig. 3. The bar is supported by suitable brackets (see Fig. 1b) depending from the frame extension channels. Each bracket has a webbed lower portion 15, the upper side of which lies flat against the bottom side of the frame flange, and may be secured thereto as by bolts 16. The brackets further have flange upward extensions 17 overlying the webs of the channels, the flange extensions being suitably secured to the webs as by bolts 18. The ends of the bar 11 are held partly in the embrace of the lower portions 15 of the brackets as by clamping plates, one of which is shown at 19 in Fig. 1b. The plates also partially embrace the bar.

The connection between the springs 10 and the transverse bar 11 preferably comprises spring seat members 20 which may support the leaves of the spring either above them, as shown in Fig. 1 for example, or below as shown in Fig. 3. The members 20 are preferably held onto the ends of the bar 11 by means of pins, not shown, which enter the respective seat members 20, and in this position, lie partly within grooves 11' formed near the ends of the bar, as shown in Fig. 1b.

As shown, the springs are held onto the seat members 20 by means of U-bolts 21, there being a semi-cylindrical clamping plate 23 on the upper side of each spring, these plates 23 being suitably grooved to retain the U-bolts. The U-bolts project through suitable ears on the seat members 20 and may be secured by the usual nuts. The arrangement obviously provides a very sturdy pivotal connection between each spring and the frame of the vehicle. As shown, the bar supporting brackets 15—17 are secured directly to the frame extension 1a, but this is not essential.

It will be understood that while we have shown all leaves of all of the springs substantially straight, that these may be originally set for the usual downward concave effect. Assuming this, then the illustrations of Figs. 1, 3 and 4 show the shape of the springs when the vehicle is loaded to capacity. Such original setting of the spring leaves in downward concave effect has an advantage in that, in turning corners, the dead axle is shifted out of parallel with the live axle, so there is less wear on the tires.

The live or driving axle comprising the usual axle sections and housing, the latter being designated 25, has a floating connection with the forward ends of the springs 10. This may be considerably modified in practice. In Fig. 1, we show the floating or sliding connection as comprising spring seat members 27 clamped onto the axle housing by seat clamping members 28 (see particularly Fig. 1a). As shown, each seat clamping member 28 is secured rearwardly of the axle by ordinary bolts 30 engaging ears in the seat member 27 and the clamping member 28, and forwardly of the axle by U-bolts, one of which is shown in Fig. 1 at 31. The clamping member 28 has a forwardly extending brackets 32 to which radius rods are secured, as will be presently shown. It will be understood that, as shown in Fig. 1, the spring seat and clamp are virtually rigid with the axle housing at all times. Extending upwardly from each of the spring seat members 27, are integral loops 35 for retaining the respective spring ends. Each spring, as shown, projects forwardly in the embrace of the loops with sufficient side clearance as at 36, to allow one end of the axle to move upwardly and the other end downwardly without necessarily twisting the spring.

The spring adjacent the seat 27 has, as shown in Fig. 1, a yielding bearing or contact leaf 37 which is held at one end by a spring clip 38, and which simply abuts the usual eye of the spring at the other. The clip 38 also supports a stabilizing leaf sections 39, this having an eye at its rearward end engaging the clip 38 and being curled downwardly at its forward end to engage the top side of one of the leaves of the spring 10. The stabilizing leaves 39 are not entirely essential, but may be used with the form shown in Fig. 1, or with the forms shown in other figures if desired, to prevent free vibration of the spring ends within the looped spring retainer members corresponding to 35.

The dead axle is indicated at 40 in all figures, and preferably comprises a bar of suitable material, such as forged steel, rectangular in shape, and provided at its ends with anti-friction bearing supporting rings, not shown, for engaging bearings of the type usually used for front steering wheels, such arrangement being desirable from the standpoint of standardization of construction.

The preferred connection between the dead axle and each spring 10 comprises a seat block 43, shaped to embrace the top corner of the axle and flattened to lie against the lower surface of the lowermost leaf of the spring, and a cooperating clamping member 44 embracing the lower corner of the axle and forcing the axle against the block 43. Forwardly from the dead axle, the clamping member 44 is borne upwardly toward the member 43 and spring 10 by U-bolts 45, but rearwardly from the axle, the member 44 is simply held to the usual eye of the lowermost leaf of the spring 10 as by a through bolt 46, suitably clamped in place by split ears 47 on the member 44. The U-bolts, as shown, rest in notches in the axle, so as to positively prevent endwise movement of the axle with relation to the springs.

It will be noted that in all figures, the distance between the vertical plane of the pivot bar 11 and the vertical plane of the live axle is considerably shorter than the distance from the plane of the bar to the vertical plane of the dead axle. This is primarily to distribute the load to the wheels in such manner that the greater portion of the load reacts downwardly on the driving wheels. The preferred ratio between the distances mentioned is 4 to 6, by reason of which 60% of the load will be supported by the traction wheels and 40% by the wheels of the dead axle. The main advantage is obvious, which is, that the driving wheels will have greater grip on the road or supporting surface. A further advantage is that by the arrangement, with the longer portions of the springs attached to the dead axle, a very rigid connection may be made between the springs and the dead axle without imposing too much twisting strain on the springs. Such rigid connection has a decided advantage from the standpoint of simplicity of construction, and in addition, does not have to be provided with special lubricating devices. When driving the truck over very uneven ground, or over bumps, which raise only one of the wheels of each pair, considerable twist is given each spring, and if the spring portions attached to the dead axle are relatively short, this twist may often result in spring breakage, whereas, the long spring withstands such twisting strain to a much greater degree. When the front pair of the two sets of rear wheels runs over bumps which raise one wheel of this pair only, there is not necessarily any twisting strain imparted to the springs, because of the side clearance as well as relative movement longitudinally of the spring between the spring and the corresponding seat member 27.

In the form of the invention shown in Figs. 1 and 2, the torque reactions are taken up by a torque tube shown at 25', and there are combined radius and driving rods 50 for preserving the position of the driven axle and its housing. The rods 50 are pivotally attached to underhanging bracket extensions 32 rigid with the members 28, previously described, as by horizontal pivot bolts 52. The forward ends of the rods 50 have double pivotal connections with suitable depending brackets 53 on the side frame members 1 of the chassis. The double pivotal connections preferably comprise swivel bolts 55, journalled to turn on substantially horizontal axes extending longitudinally of the chassis, the rear ends of the bolts 55 being embraced by bifurcated arms on the forward ends of the rods 50, the bifurcated ends being secured to respective bolts, as by transverse horizontally extending pins or bolts 56. The various pivotal connections between the rods 50 and the axle and chassis allow, as will be obvious, a free floating movement of the driven axle under all practical conditions, without strain on the various parts.

As shown in Figs. 3 and 3a, the floating connection between the forward ends of the springs 10 and the live axle housing, comprises depending looped channels 60, which are pivotally secured to the axle housing by suitable straps 61. These do not clamp against the housing with such force as to prevent a rocking movement of the spring support. In this construction, the eye on the lowermost leaf of each spring rests in a channel formation 63 at the bottom of the loop and the eye may be further secured as by a through bolt 64. In the construction shown in Fig. 3, the rear ends of the springs 10, as well as the front ends, lie beneath the respective axles, but the supports for the spring are substantially the same as with the other figures. The position of the parts, previously designated 20 and 23 however, are reversed. The part 23 is at the bottom of the spring instead of at the top and the part 20 at the bottom.

In Figs. 4 and 4a, instead of providing the spring with a special bearing leaf section, we allow the eye of the bottommost spring leaf to ride along a plane surface, designated 65, forming the floor of the spring seat member 27'. In this construction, the clamping bolts are inserted in recesses 67, which recesses occupy only a portion of the plane surface on which the spring eye slides. Otherwise, the construction of Fig. 4 is essentially the same as that shown in Figs. 1 and 1a.

For hauling loads over surfaces such as mud, sand, snow and the like, it is sometimes desirable to provide greater traction. This may be accomplished by a caterpillar tractor adaptation, suggested in Fig. 3, but which may of course be used in connection with any of the other figures shown. The caterpillar arrangement may be considerably modified, but essentially, it consists in connecting the wheels 3 and 4 on each side of the chassis with endless chains or traction belts, indicated diagrammatically in broken lines at 70, Fig. 3. Any suitable idler arrangement may be employed in connection with this device for keeping the chains or belts taut. There are many devices on the market for this purpose and therefore we do not deem it necessary to illustrate any specific arrangement. With the caterpillar adaptation, both wheels 3 and 4 of each pair are of course driven, and the vehicle has additional traction by reason of the stretch of chain or belt passing between the two wheels and along the ground.

In the modification shown in Figs. 5 and 6, the spring supports and connections for the two springs 10 are substantially in accordance with the previously described figures, referring particularly to Figs. 1, 2 and 4, and the parts are similarly numbered. The axle housing for the live axles, as shown, is made square at the ends and there are individual connecting devices for the front ends of the springs 10 and the rear ends of combination torque and radius rod arrangements, the latter being indicated generally at 75. The attaching devices for the springs 10 are shown as bracket-like members 77 having retaining loops 78 passing over the spring ends and seats 79 on which the spring ends normally rest flatwise. The members 77 are fastened to the axle by suitable U-bolts 80 in upright position.

The combined torque and radius rod members 75 are preferably formed similar to laminated leaf springs and are rigidly connected at their rear ends to the axle housing by means of U-bolts 83 and clamping members 84, the U-bolts for the rod members 75 being inverted and embracing the axle housing. At their front ends, the rod members 75 are pivotally slung from depending attaching brackets 85 on the side frame members of the chassis frame. The spring leaves of the members 75 are preferably arranged, as shown in Fig. 5, wherein it will be seen that there is a long central leaf embraced by stepped back shorter leaves above and below the long leaf, all the leaves being secured together by the usual straps 86. The central leaves of both members 75 have eyes, not shown, embracing respective shackle bolts 87 suitably secured to the depending brackets 85. With this arrangement, it is unnecessary to provide a torque tube, since the members 75 take up all the necessary torque and driving reactions incident to propelling the vehicle. By reason of the resilient character of the members 75, the unit, shown in Figs. 5 and 6, has considerable flexibility in operation and is extremely simple.

From the above description, it will be seen that we have provided a mechanism for use in connection with a load carrying motor driven vehicle by which, without making any change in the original vehicle construction, we may effectively support and carry substantially double the load for which the original vehicle is designed. Further, this load will be distributed to the pairs of rear wheels in a very effective manner, particular reference being had to the fact that the traction wheels carry the greater burden, and therefore, have adequate traction under all conditions. Our arrangement, moreover, does not require any change in the braking mechanism because it follows that if the traction wheels, already provided with brakes, have adequate traction, they will also have adequate braking action. It will be further seen that the arrangement will have a high degree of flexibility with minimum strain. The additional frame strains are taken up in the frame extension which is very rigid, being well braced. The radius rods hold the live axle for vertical movement, and without twisting of the rods, allow free canting movement of the axle for uneven roads. During such canting movement there is practically no twist on the short front portions of the leaf springs, while the rear portions of the leaf springs are long enough to stand the necessary twisting without danger of breakage.

It will be clear from the above that all the load on the load carrying portion of the vehicle, will be transmitted directly to the axles and not through shackles as in the usual construction, thereby making the job practically free from troubles, due to inadequate lubrication.

Further, the mechanism provides for closely positioning the wheels of each pair, thereby minimizing slide slippage and wear on the tires in turning corners, as well as excessive side strains on the spring suspension, frame and other parts.

We claim:

1. In a motor driven vehicle, a longitudinally extending frame adapted to support a load, a pair of rearwardly disposed traction wheels and a driving axle therefor, a pair of rearwardly disposed load carrying wheels and a non-driving axle therefor, a pair of multiple leaf springs, means to pivotally secure the springs, intermediately of their ends, to the frame on a transverse horizontal axis, and means for securing the end portions of said springs to the respective axles, the non-driving axle being disposed a materially greater horizontal distance from the pivot axis of the spring than the driving axle, whereby the greater portion of the load will be imparted to the driving axle and traction wheels, said springs and the means connecting the same to the non-driving axle constituting the sole connection from the frame to the non-driving axle.

2. Mechanism according to claim 1 wherein the ratio between the horizontal distances from the spring supporting pivot axis to the driving wheel axle and the non-driven wheel axle, is substantially 4 to 6.

3. Mechanism according to claim 1 wherein the springs have substantially rigid connections with the non-driving axle, and the connection to the driving axle permits relative horizontal floating movement between the axle and springs, there being means in addition to the springs for connecting the driving axle to the frame, arranged to guide this axle for substantially vertical movement.

4. In a motor driven load carrying vehicle, a pair of longitudinally extending frame members, a pair of springs, and means pivotally connecting the springs with said frame members on a transverse horizontal pivot axis, a driving axle and wheels carried thereby, means to slidably connect the driving axle with said springs, a non-driving axle and wheels carried thereby, and means connecting the rear ends of said springs to the non-driving axle, said slidable connection between the springs and the driving axle comprising brackets rigidly mounted on the driving axle housing and providing guides for the springs, a pair of radius rods pivotally secured to respective brackets at their rear ends, and means to pivotally support the forward ends of the radius rods on the frame, the last named means including a swivel joint with fixed and movable elements, the axis of the movable element being substantially parallel to the frame members, said means further including transverse pivotal connections between the rods and the movable element of each swivel joint whereby the ends of the driving axle may be raised and lowered unequally without twisting strain on the rods.

5. In a motor driven vehicle, a driving and a non-driving axle and wheels supported by each axle, the driving axle including a rigid housing, a frame for the vehicle, a spring suspension between the axles and frame comprising leaf springs and means to pivotally support the springs on the frame on a horizontal axis disposed intermediately of the ends of the springs, each of said springs having a rigid connection with the non-driving axle and a horizontal floating connection with the driving axle housing, the non-driving axle being the more remote from the spring pivot whereby the major portion of the load is transmitted to the driving axle, and driving reactance means interposed between the driving axle and frame, said driving reactance means being connected with the said housing and cooperating therewith to hold the elements of the floating connection between the springs and driving axle in a definite relation to the springs.

6. In a motor driven vehicle, a pair of longitudinally extending frame members, a driving axle, a housing therefor, and wheels connected to the axle, a dead axle and wheels connected therewith, a spring suspension for said axles comprising leaf springs pivotally connected intermediate their ends to said frame members and having the major portion of their length disposed rearwardly from the pivot axis to transmit load to the dead axle, rigid means connecting the rear ends of the springs with the dead axle, said springs and rigid means forming the sole connection from the frame to the dead axle, a bracket on the housing and a strap carried by the bracket loosely guiding the front ends of the springs with relation to the axle housing, and permitting longitudinal and rotational movement between the housing and springs without distorting the springs, and means connecting the brackets with the frame for holding the brackets in position to loosely guide the springs as aforesaid.

7. In a motor-driven vehicle, a pair of axles disposed at the rear of the vehicle, a pair of wheels on each axle, one pair being driven by its respective axle, a housing for one of the axles, brackets on the housing, means connecting the brackets to the vehicle frame permitting the housing to float substantially vertically relative to the frame, channel rests on the brackets, and springs on the frame slidably engaging the rests, said springs comprising the usual laminated leaf arrangements, there being an additional downwardly bowed leaf engaging one of the spring leaves at spaced points and riding on the channel rest intermediately of such spaced points.

8. In a motor vehicle, a frame adapted to support a load, a pair of load carrying driven wheels disposed intermediately of the ends of the frame, a pair of load carrying non-driven wheels disposed rearwardly from the driven wheels, axles for each pair of wheels, a pair of springs and means to pivotally support and secure the springs intermediately of their ends to the frame on a substantially horizontal axis, means freely and slidably connecting an end portion of each spring to the same one of said axles, and means connecting the opposite end of each of said springs to the other axle, the axle for the non-driven wheels being disposed a materially greater horizontal distance from the spring supporting axis than the axle for the driven wheels.

CHARLES E. F. AHLM.
GEORGE L. ELMSLIE.